Patented Oct. 21, 1930

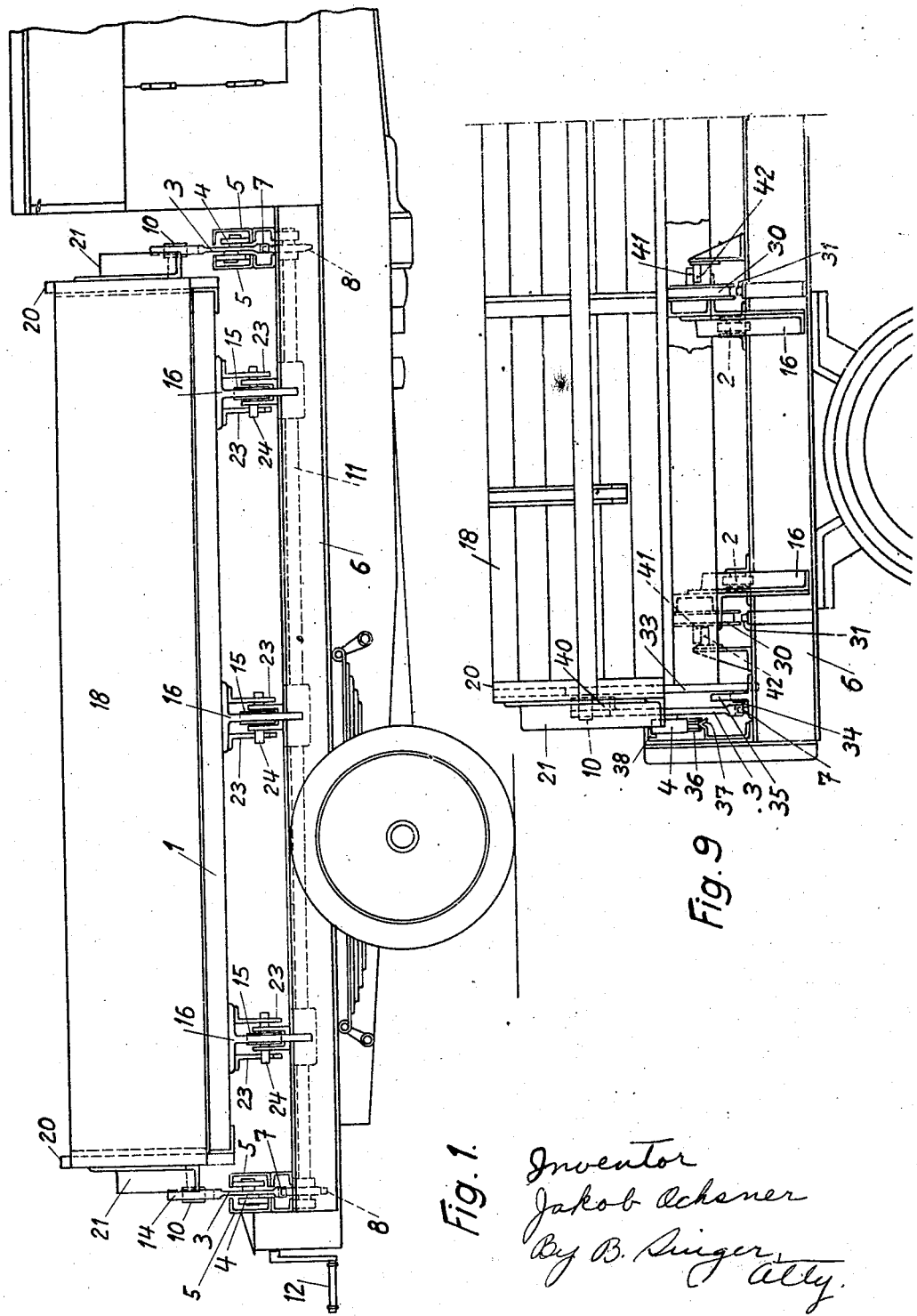

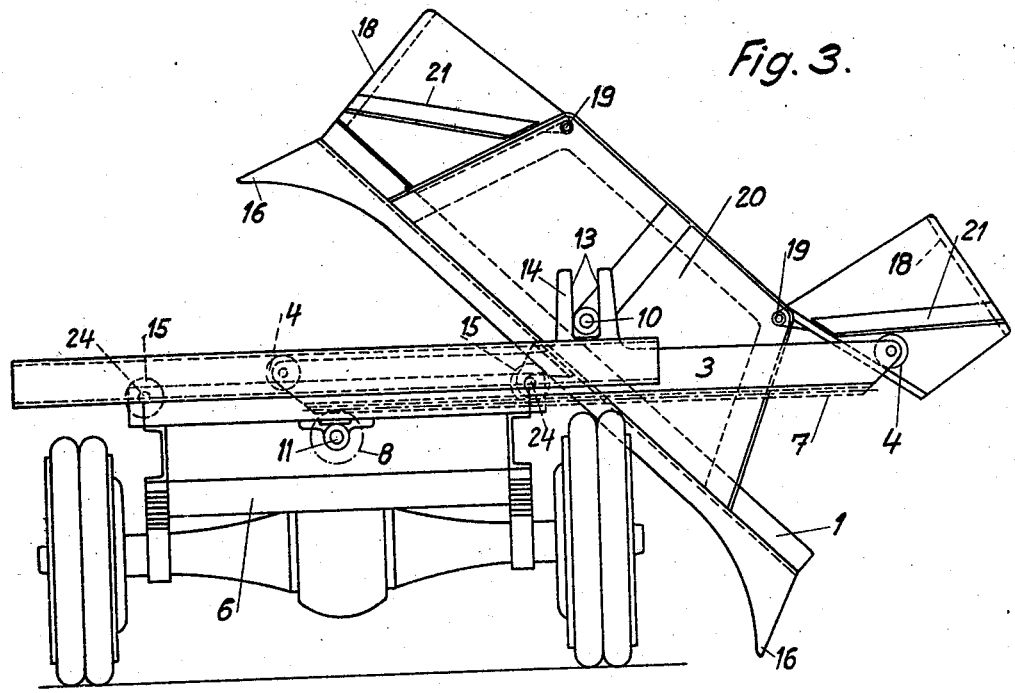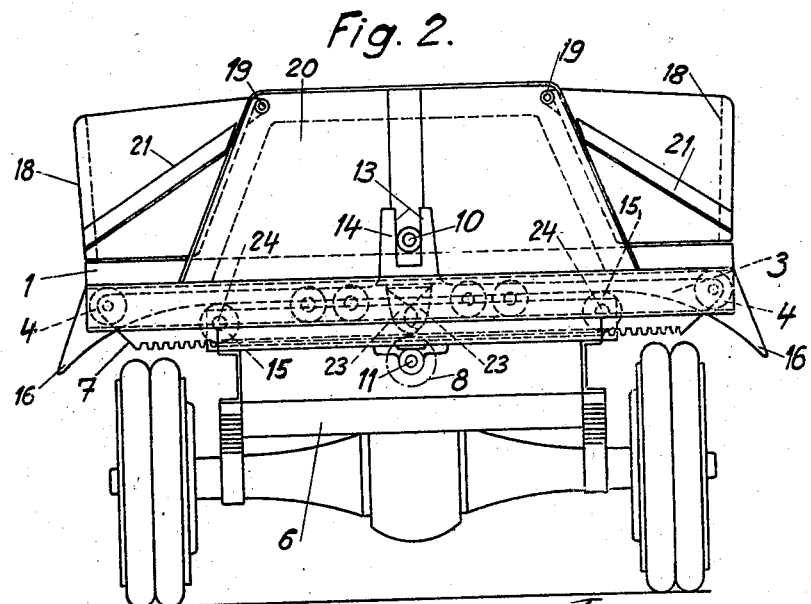

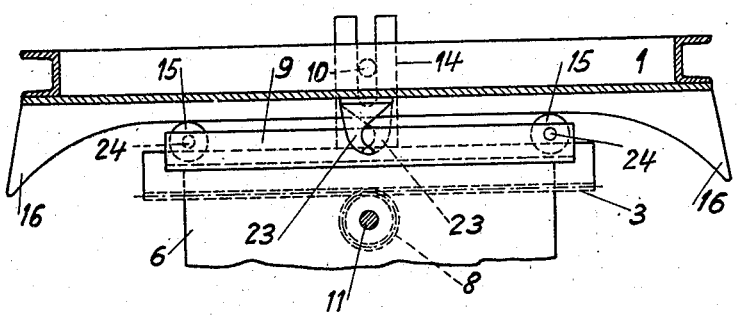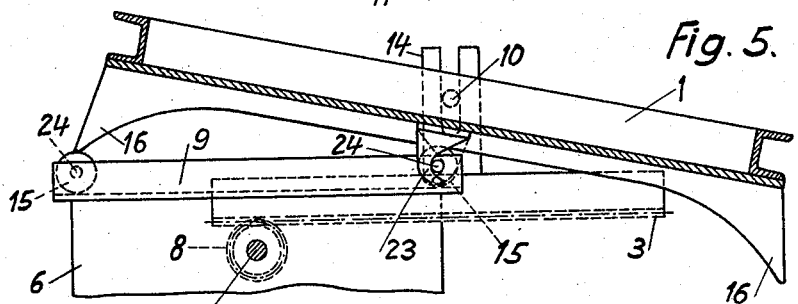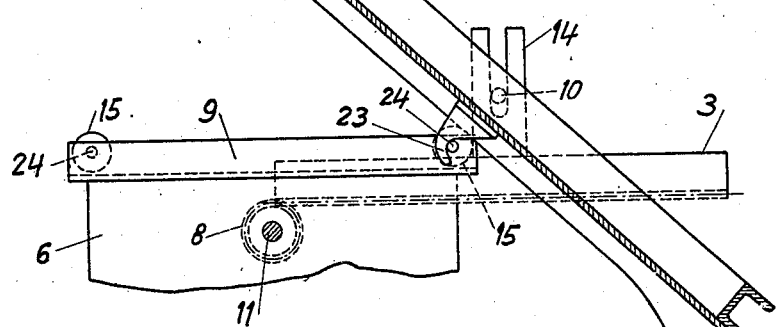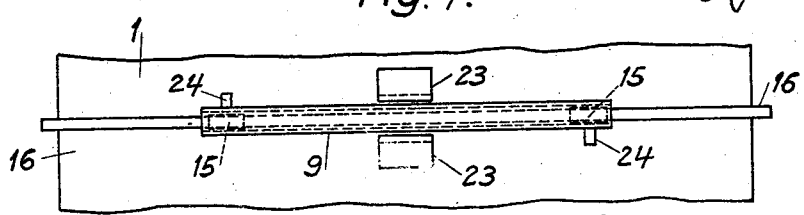

1,778,866

UNITED STATES PATENT OFFICE

JAKOB OCHSNER, OF ZURICH, SWITZERLAND

TIPPING BODY

Application filed June 3, 1927. Serial No. 196,341.

The invention relates to vehicles having bodies or platforms which can be tipped sideways for discharging the load at the side of the track. The main object of the invention is to provide a simple practical vehicle for carrying municipal refuse, which is, according to modern practice, frequently taken out into the country, sometimes a long way, and has to be discharged on to the ground, without hand labor. The utility of the invention is, however, not confined to refuse carts, and it may be applied to vehicles for carrying sand, gravel and many other materials.

The invention may be applied to any form of vehicle, whether mechanically propelled or otherwise, and whether adapted to run on rails or not.

In this specification I shall generally refer to the tiltable part of the vehicle as the platform, using that term to apply also to cases where side and end walls are provided so that the tiltable part is in fact a vehicle body or box.

According to the invention the platform is pivoted to runners, whereby it can be traversed in guides on the under frame of the vehicle, means being provided for moving the runners outwards and inwards, and means being also provided whereby the platform is automatically tipped when it approaches its outer position. I may provide also means whereby the tipping of the platform is accompanied by the automatic opening of hinged side walls connected to the platform itself or to separate receptacles standing upon the platform.

The invention is illustrated in the annexed drawings in a diagrammatical manner.

Fig. 1 is a side view of a motor-propelled refuse carrier, partly broken away, and Figs. 2 and 3 are rear views thereof, showing the platform in normal position and tipped, respectively.

Fig. 4 is a cross-section through the platform showing the same in normal position.

Fig. 5 is a similar view showing the platform laterally displaced, before complete tipping.

Fig. 6 is a view showing the platform fully tipped,

Fig. 7 is a bottom plan view of part of the mechanism,

Figs. 8 to 10 illustrate a second form of construction, Fig. 8 is a cross section showing the platform in horizontal and normal position, Fig. 9 is a side elevation of the hind part of the vehicle, Fig. 10 shows the platform fully tipped.

Figure 8:
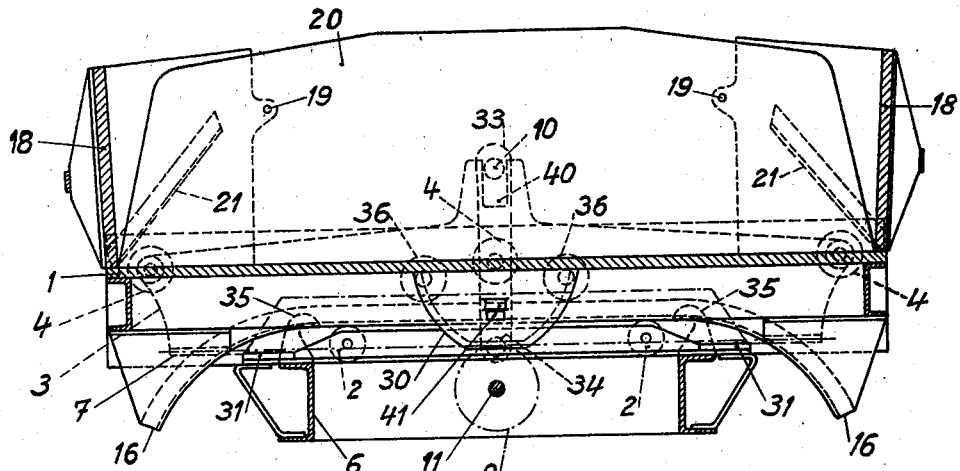

The vehicle shown in Figs. 1 to 7 has an underframe 6 of any well known construction. On the said underframe rollers 15 are rotatably mounted and on the rollers 15 a platform 1 is mounted for lateral movement in either direction. Near the front and rear ends of the platform 1 there are runners 3, having upright slotted guides 14. Into the slots 13 project studs 10 rigidly connected to said platform. The runners 3 have rollers 4, whereby they are guided in supports 5 on the underframe 6 of the vehicle. At the underside of each runner 3 there is a rack 7 engaged with a spur wheel 8. The wheels 8 are fixed to a shaft 11 mounted on the underframe 6 of the vehicle. The shaft 11 can be turned by means of a hand crank 12 and toothed gearing not shown in the drawing. In the case of a motor propelled vehicle, however, means may be provided for coupling the shaft 11 with the motor, in order to use the motor for tipping the platform 1. By rotation of the shaft 11 the platform 1 is run on one side or the other of the vehicle. Fixed to the underside of the platform 1 are several transverse girders 16. These girders 16 normally rest on rollers 15 mounted on crossbars 9 of the underframe 6. The girders are arched at their ends so that by moving the platform 1 sideways in either direction a tilt is imparted thereto. Fixed centrally to the underside of the platform 1 are hooks 23 facing in opposite directions, several pairs of such hooks 23 being distributed, lengthwise, of the platform 1. The two hooks of each pair are arranged on different sides of the girder 16 and close thereto. In the path of each hook 23, when travelling in the direction which it faces, is a stud 24 which in the example shown is a projecting portion of the pivot of one of the rollers 15. The curvature of the end portions of the girder 16 is such that before the hook reaches the stud 24 the platform is given a preliminary tilt, which lifts the hook 23 in a position to engage the stud accurately and smoothly. Continued outward movement of the platform 1 then causes it to be tipped quickly.

In order to effect the discharge of the load without manual labour the side walls 18 are connected to the end walls 20 by pivots 19. To each side wall are fixed rails 21 and when the platform 1 is tilted these rails 21 strike the outside rollers 4, which push the wall 18 away from the platform 1 and thus allow the load to be discharged at the side of the track beyond the wheels. The platform 1 receives a substantial lateral movement, so that the load is discharged quite clear of the track.

The construction just described may be used not only for road motor lorries runnig on the road but may be used for vehicles running on rails.

Figure 10:
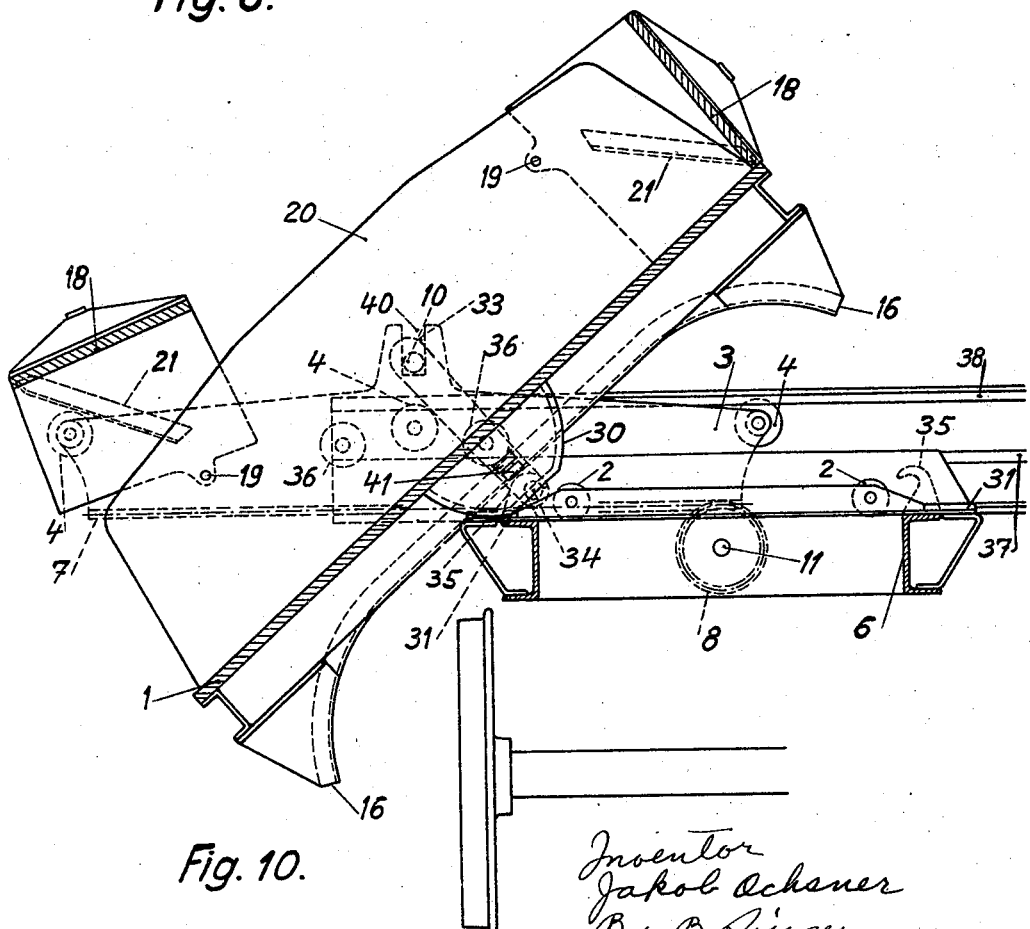

In the modified construction shown in Figs. 8 to 10 the platform 1 is provided with several curved supporting members 16 the ends of which are curved downwardly. The members 16 fixed to the platform are supported by rollers 2 rotatably mounted in the underframe 6. The platform 1 is provided with a number of semi-circular disks 30 rigidly fixed to the platform 1 and on the underframe 6 abutments 31 are fixed and arranged so that by outward movement of the platform 1 the disks 30 are caused to engage the abutments and to roll thereon. At the front end and the rear end of the platform 1 an arm 33 is rigidly fixed. Each arm 33 is provided at the upper end with a stud 10 and at the lower end with a stud 34. Fixed to the underframe 6 are hooks 35 facing in opposite direction arranged in the path of the studs 34 when travelling in the direction towards which it faces. Movement of the platform 1 to the position shown in Fig. 10 causes the studs 34 to engage their hooks 35 so that continued movement of the platform 1 causes the same to be quickly tipped as shown in Fig. 10. The disks 30 are in engagement with the abutments 31 and support the platform 1 while it tips. To move the platform 1 sideways the same mechanism is used as described with reference to the Figs. 1 to 7. A runner 3 is arranged at each end of the platform 1 having a rack 7 at its lower end. With each rack 7 a spur wheel 8 meshes, the wheels 8 are fixed to a shaft 11 rotatably mounted in the underframe 6. Each runner 3 is provided with two supporting rollers 36 and two guide rollers 4. The rollers 4 and 36 run between guide rails 37, 38 rigidly fastened to the underframe 6. The rollers 4 at the ends of the runners 3 are used to tilt the sidewalls of the car as described above. The runners 3 are each provided at the center with a vertical slot 40 into which the stud 10 projects. To prevent the platform 1 from shifting in longitudinal direction rollers 41 are rotatably mounted on brackets fixed to the disks 30, said rollers 41 running on bars 42 fastened to the underframe 6. The rollers 41 do not leave the bars 42 while the platform is tipping, they relieve the working mechanism from any dangerous stress. The platform 1 itself is supported by the rollers 2 and the members 16 the curvature of which being such that the studs 34 pass into the hooks 35.

What I claim and wish to secure by United States Letters Patent, is:

1. A vehicle having a body or platform and runners to which it is connected for pivotal and also for vertical movement, an under frame, means for moving said runners with the platform transversely of the under frame, a member fixed to the under side of the platform and presenting a cam surface, a supporting roller on the under frame engaged by the cam surface of said member and on which said member moves, a hook member extending downwardly from the center of the platform and a stop element at one side of the under frame and engaged by said hook when the platform is moved to one side of the under frame, said cam surface, said supporting roller, said hook and said stop element coacting to impart preliminary tilt to the platform, which tilt is facilitated by the free pivotal connection between the platform and the runners.

2. A vehicle as claimed in claim 1, in which the runners have vertical slotted members and the body has pivots engaged in the slots of said members to adapt the body for pivotal and vertical movement and in which there are two of the supporting rollers, one at each side of the under frame, and one of said rollers has a projecting axle which forms the stop element engageable by the hook member.

In witness whereof I affix my signature.

JAKOB OCHSNER.